(12) United States Patent
Reiner

(10) Patent No.: US 6,920,342 B2
(45) Date of Patent: Jul. 19, 2005

(54) ELECTRONIC DEVICE HAVING AN OPERATING MODE AND AN ENERGY SAVING STANDBY MODE, AND A METHOD FOR SWITCHING BETWEEN THE TWO MODES

(75) Inventor: Robert Reiner, Neubiberg (DE)

(73) Assignee: Infineon Technologies AG, Munich (DE)

( * ) Notice: Subject to any disclaimer, the term of this patent is extended or adjusted under 35 U.S.C. 154(b) by 482 days.

(21) Appl. No.: 10/174,059

(22) Filed: Jun. 17, 2002

(65) Prior Publication Data

US 2002/0169009 A1 Nov. 14, 2002

Related U.S. Application Data

(63) Continuation of application No. PCT/DE00/04283, filed on Dec. 1, 2000.

(30) Foreign Application Priority Data

Dec. 16, 1999 (EP) ............................................. 99125116

(51) Int. Cl.[7] ................................................ H04B 1/16
(52) U.S. Cl. ................ 455/574; 455/343.2; 455/127.5; 455/68; 455/69; 370/311; 340/7.33; 340/7.36
(58) Field of Search ............................. 455/574, 343.2, 455/127.5, 68, 69; 370/311; 340/7.33, 7.36

(56) References Cited

U.S. PATENT DOCUMENTS 4,131,764 A * 12/1978 Claasen et al. ............. 370/210
4,857,917 A    8/1989 Sato
5,790,946 A * 8/1998 Rotzoll ...................... 455/343.1
6,198,913 B1 * 3/2001 Sung et al. .............. 455/343.3
6,445,937 B1 * 9/2002 daSilva ........................ 455/574
6,681,080 B1   1/2004 Pammer et al.

FOREIGN PATENT DOCUMENTS

| EP | 0 554 386 B1 | 8/1993 |
| EP | 0 601 820 A1 | 6/1994 |
| EP | 0 609 694 A2 | 8/1994 |
| EP | 0 797 308 A2 | 9/1997 |
| WO | 99/03219 | 1/1999 |

* cited by examiner

Primary Examiner—Sonny Trinh
Assistant Examiner—Huy Phan
(74) Attorney, Agent, or Firm—Laurence A. Greenberg; Werner H. Stemer; Ralph E. Locher

(57) ABSTRACT

An electronic device has an operating mode and an energy saving standby mode. The electronic device includes an input-side antenna element for receiving a signal carrying information, a receiving unit for processing the basic information carried on the signal, a voltage supply unit for providing the supply voltage required for operation, and a switching unit for switching between the operating mode and the standby mode. First, to minimize the current being drawn in the standby mode, and second to ensure quick and reliable switching from the energy saving standby mode to the operating mode as required, it is proposed that the signal carrying the information includes a number of modulated frequency bands. At least one frequency band is intended for the basic information to be processed by the receiving unit. The other frequency band contains wake-up information for actuating the switching unit.

15 Claims, 2 Drawing Sheets

ELECTRONIC DEVICE HAVING AN OPERATING MODE AND AN ENERGY SAVING STANDBY MODE, AND A METHOD FOR SWITCHING BETWEEN THE TWO MODES

CROSS-REFERENCE TO RELATED APPLICATION

This application is a continuation of copending International Application No. PCT/DE00/04283, filed Dec. 1, 2000, which designated the U.S. and was not published in English.

BACKGROUND OF THE INVENTION

Field of the Invention

The invention relates to an electronic device having an operating mode and an energy saving standby mode, and to a method for switching between the two modes.

The field of the present invention preferably covers receivers and transmitter/receivers (transceivers) that are supplied with voltage by a battery. Devices and methods for energy saving are used to prevent the batteries in these appliances from quickly becoming dead or empty. In order to save electrical energy in states in which there is no need for the electronic device to be operated, this appliance can be switched from a normal operating mode to an energy saving standby mode. In this case, all those parts of the appliance that result in a high current draw are generally switched off. The only parts that remain active are those used for switching back to the operating mode. This switching-back process is generally carried out automatically by identifying a valid external signal. This drastically reduces the overall current draw of the electronic device. Since, in the case of battery-powered electronic devices, the time in the standby mode is generally many times longer than the time in the operating mode, it is desirable for the appliance to have a very sparing current draw in the standby mode, in order to maximize the useful life of the battery.

An electronic device of this generic type is known from Issued European Patent EP 0 554 386 B1. The receiver includes an input-side antenna element for receiving a signal carrying information, in this case in the form of an RF (radio frequency) radio signal.

For the purposes of the present invention, the term antenna element is defined as an input-side element of the electronic device, which converts radiation energy to energy carried by cables for the receiving unit. In principle, radiowaves, microwaves, lightwaves or waves in some other frequency spectrum that is suitable for transporting information can be received by the antenna element as radiation energy. By way of example, the "antenna element" may thus also be a photoelement in order to receive lightwaves. If energy supplied by cables is already available on the input side, then it may even be possible to dispense entirely with the antenna element, replacing it by a suitable interface—for example by a socket arrangement.

In the case of the present receiver, a receiving unit that is connected downstream from the antenna element has a demodulator for recovering the AF (audio frequency) radio signal as basic information that has been modulated on the RF signal in accordance with the modulation method used at the transmitter end. An optical indication for the operating parameters, various control elements for manually adjusting the receiver, as well as a loudspeaker for emitting the AF radio signal are controlled by a central controller, which controls their interaction. A battery is provided as the voltage supply unit for providing the supply voltage required for operating the receiver. In order to achieve a long battery life, the receiver has an operating mode and a standby mode. Switching devices for switching between the two modes are integrated into the central controller.

Switching from the operating mode to the standby mode is carried out automatically when a noise switching-off signal is present. In the standby mode, the receiver is not ready to operate. The system is woken up from the standby mode by periodically switching on the operating mode at defined time intervals. A timer, whose time consumption is as low as possible, runs in the standby mode for this purpose. When the receiver is ready to operate, the controller thus very quickly checks whether a valid RF radio signal is being received on the input side. If a noise switching-off signal is present instead of this, then the receiver returns to the standby mode again. This method has the disadvantage that the process of switching on the operating mode on a sample, time-controlled basis, which is often unsuccessful, results in quite a high current draw. Attempts have been made to minimize the current draw by identifying the presence of a signal on the input side as quickly as possible, in order to make it possible to return to the energy saving standby mode as quickly as possible where necessary. With this method, when information is not transmitted continuously, that is to say it is transmitted in a pulsed form, it is still possible for a problem to occur when the transmitter is transmitting during a time in which the receiver is not ready to operate, so that the receiver cannot reliably receive the signal carrying the information. In order to preclude this problem, it is necessary either for the transmitter to transmit for a long enough period, or for the time intervals between the waking-up processes to be matched to the transmitted pulse length.

A method for waking up from the standby mode is also generally known, in which the problems discussed above are avoided by ensuring that the electronic device is ready to operate all of the time, despite being in a standby mode with restricted functionality. In this case, circuit components whose current draw is high are switched off in the standby mode. The only circuit components which are kept in operation are those which are used for monitoring the status of devices on the input side, such as receivers, sensors, detectors. In this way, it is possible to confirm when there is once again a requirement to switch on the other circuit components whose current draw is high, in order to initiate the process of waking up from the standby mode to the operating mode.

By way of example, the receiver sensitivity can be reduced in the standby mode. The receiver can then distinguish only roughly between the system's own signals and external signals, but draws less current in the process. As soon as a signal arrives which overrides the selection to maintain the standby mode, the receiver changes fully or partially to the operating mode in order to check the validity of the signal. In comparison with the method described initially, the transmitter may admittedly transmit signals in a pulse manner in this method; however, since it is necessary for the circuit components to be permanently active, the current draw is generally greater. In this case, owing to the reduced sensitivity, it is also difficult to distinguish between disturbances and the system's own signals, which leads to spurious changes to the operating mode. This results in a disadvantageous increase in the energy consumption.

SUMMARY OF THE INVENTION

It is accordingly an object of the invention to provide an electronic device having an operating mode and an energy saving standby mode and a method for switching from the standby mode to the operating mode which overcome the above-mentioned disadvantages of the prior art apparatus and methods of this general type.

In particular, it is an object of the invention to further improve an electronic device having an operating mode and an energy saving standby mode, such that, first, the current draw in the standby mode is a minimum, and such that, second, quick and reliable switching from the energy saving standby mode to the operating mode is ensured as required.

With regard to the electronic device with an operating mode and a standby mode, the invention includes the technical teaching that the incoming signal carrying the information includes a number of modulated frequency bands (Fg, Fa), of which at least one frequency band (Fg) is intended for the basic information (g) to be processed by a receiving unit, and another frequency band (Fa) contains wake-up information (a) for actuating a switching unit for switching between the operating mode and the standby mode.

This solution offers the advantage that a separate frequency band (Fa) which is separated from the transmission of the basic information (g)—for example speech information—is available on its own for implementing the wake-up function, thus ensuring that the waking-up process is carried out as required with powerful wake-up-information (a) that is intrinsic to the system. The data interchange with the transmitter may take place continuously, so that no information loss occurs and so that it is also possible, in the case of a transceiver, to use a so-called backscattering method for sending back information, which also saves transmission power. There is no need to carry out any complicated validity test of the content of the entire signal carrying the information in the operating mode, which, furthermore, also shortens the wake-up time. Since the separate frequency band (Fa) containing the wake-up information (a) can be passively filtered out of the incoming signal carrying the information, the current draw in the standby mode is minimal. Either only a small number of, active circuit parts or no parts that draw current are thus required to identify the signal.

In particular, the last-mentioned advantage can be implemented by connecting a filter unit downstream from the antenna unit. This filter unit separates the frequency band (Fa) for the wake-up information (a) from the signal carrying the information, and supplies the frequency band (Fa) to a passive demodulation unit for demodulating the wake-up information (a). The demodulation unit demodulation unit finally actuates the switching unit.

A further measure that improves the invention consists in using a single filter element not only for frequency filtering for the frequency band (Fg) for the basic information (g), but also for frequency filtering for the frequency band (Fa) for the wake-up information (a), in order to minimize the circuitry component complexity. In this case, the filter element is preferably in the form of an SAW filter (Surface Acoustic Wave) which, as is known, can be manufactured with a high level of reproduction accuracy and stability. The integration of the frequency filtering in a single component using the SAW filter is also advantageous because, in this case, the amplitude response and the phase response can be dimensioned independently of one another. This opens up the capability, if required, of combining the narrowband bandpath filters used in the receiver with dispersion filters, in a simple manner.

In this context, a further improvement of the invention provides that the wake-up information (a) is processed using chirp compression in order to increase the magnitude of the pulses in the frequency band (Fa). Chirp compression, which is generally known from the prior art, relates to a pulse whose carrier frequency rises or falls in a defined manner during the pulse. This pulse is transmitted for a relatively long time by the transmitter, at the maximum permissible power level. At the receiver end, this pulse passes through the SAW filter element with a passive compression filter, whose delay times differ for different frequencies. The received power is thus concentrated in a relatively short time period, thus increasing the amplitude. This increase in the amplitude of the pulses in the frequency band (Fa) for the wake-up information (a) by using chirp compression results in an improvement in the wake-up function's susceptibility to disturbances and in a reduction in the error rate, since the incoming signal carrying the information can be selected not only on the basis of frequency but also on the basis of the chirp function. The improvement in the signal-to-noise ratio which is possible using chirp technology may also optionally be used to reduce the transmission power or to increase the range and signal-to-noise ratio.

A further measure that improves the invention with regard to reliable passive identification of the wake-up signal provides for the wake-up information (a) to be modulated as a pulse sequence (burst). This measure can be carried out independently of the chirp compression explained above, and likewise represents a capability to distinguish disturbances. In particular, in order to distinguish between disturbances and the system's own signals, the wake-up information (a) may be a frequency-modulated pulse signal, in which case the passive demodulation element may be designed in a simple manner in the form of a passive tuned circuit which is tuned to the pulse repetition frequency, in order to filter out the pulse sequence. In this case, the nature of the modulation that is to say in this case the frequency of the pulse sequence—provides the identification facility to reliably distinguish between the system's own signal and disturbances.

The invention allows a suitable frequency band, which is subject to standardized approval conditions, to be chosen for each of the two frequency bands (Fa, Fg). The frequency band (Fa), which includes the wake-up information (a) may thus advantageously be located in the generally usable frequency band in the band range from 869.4 to 869.65 MHz. In accordance with CEPT/ERC/IREC 70-03, this frequency band can be used to transmit short pulses at a relatively high power level of up to ERP=500 mW as wake-up information (a). The restriction of the maximum permissible duty ratio to 360 s in one hour that is required in this case has no disadvantageous effect on the wake-up functionality of the receiver.

The frequency band (Fg) containing the basic information (g) may advantageously be located in the band range from 869.7 MHz to 870.0 MHz as the frequency band for transmission at a low transmission power level up to ERP=5 mW since the receiver, which is switched from the standby mode to the normal operating mode, offers greater sensitivity. Continuous transmission is allowed in this frequency band.

With the foregoing and other objects in view there is provided, in accordance with the invention, an electronic device, including an antenna element for receiving a signal carrying information. The signal, carrying the information, includes at least a first modulated frequency band for carrying basic information and a second modulated frequency band for carrying wake-up information. The electronic device also includes a receiving unit for processing the basic information carried on the signal. The receiving unit has an operating mode and an energy saving standby mode. The electronic device also includes a voltage supply unit for providing a supply voltage required for operation, and a switching unit for switching between the operating mode and the standby mode. The switching unit is actuated by the wake-up information.

In accordance with an added feature of the invention, there is provided, a filter unit connected downstream from the antenna unit. The filter unit separates the second frequency band carrying the wake-up information from the signal carrying the information. A demodulation unit is also provided, which obtains the second frequency band from the filter unit. The demodulation unit demodulates the wake-up information. The demodulation unit is at least partially passive and actuates the switching unit. The demodulation unit is as passive as possible, and can be completely passive.

In accordance with an additional feature of the invention, the filter element is also designed for separating the first frequency band, carrying the basic information, from the signal carrying the information.

In accordance with another feature of the invention, the filter unit is SAW filter.

In accordance with a further feature of the invention, the wake-up information is processed by chirp compression to increase a magnitude of pulses in the second frequency band.

In accordance with a further added feature of the invention, the wake-up information is modulated to be a single pulse or a pulse sequence.

In accordance with a further additional feature of the invention, in order to distinguish the wake-up information from disturbances, the wake-up information is a pulse sequence having a pulse repetition frequency. In addition, the demodulation unit is designed as a passive tuned circuit that is tuned to the pulse repetition frequency in order to filter out the pulse sequence.

In accordance with another added feature of the invention, the second frequency band, carrying the wake-up information, is a standardized, generally usable frequency band in a band range from 869.4 MHz to 869.65 MHz.

In accordance with another additional feature of the invention, the first frequency band carrying the basic information is a standardized frequency band for transmitting at a transmission power level of up to 5 mW in a band range from 869.7 MHz to 870.0 MHz.

In accordance with yet an added feature of the invention, the voltage supply unit is a disposable battery or a rechargeable battery.

In accordance with yet an additional feature of the invention, the antenna element is matched to a nature of the signal carrying the information.

In accordance with yet another feature of the invention, the antenna element is in a dipole, a coil, a capacitor plate, or a photoelement.

With the foregoing and other objects in view there is provided, in accordance with the invention, a method for switching from an energy saving standby mode to an operating mode. The method includes steps of: receiving a signal having a plurality of modulated frequency bands and carrying information; filtering the signal to obtain a first frequency band for carrying basic information and a second frequency band for carrying wake-up information; demodulating the second frequency band to obtain the wake-up information; waking up from the standby mode to the operating mode when the second frequency band contains the wake-up information, and subsequently processing the basic information carried in the first frequency band; and remaining in the standby mode for as long as no wake-up information is being carried by the second frequency band.

In accordance with an added mode of the invention, the electronic device is switched from the standby mode to the operating mode.

Other features which are considered as characteristic for the invention are set forth in the appended claims.

Although the invention is illustrated and described herein as embodied in an electronic device having an operating mode and an energy saving standby mode, and a method for switching between the two modes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
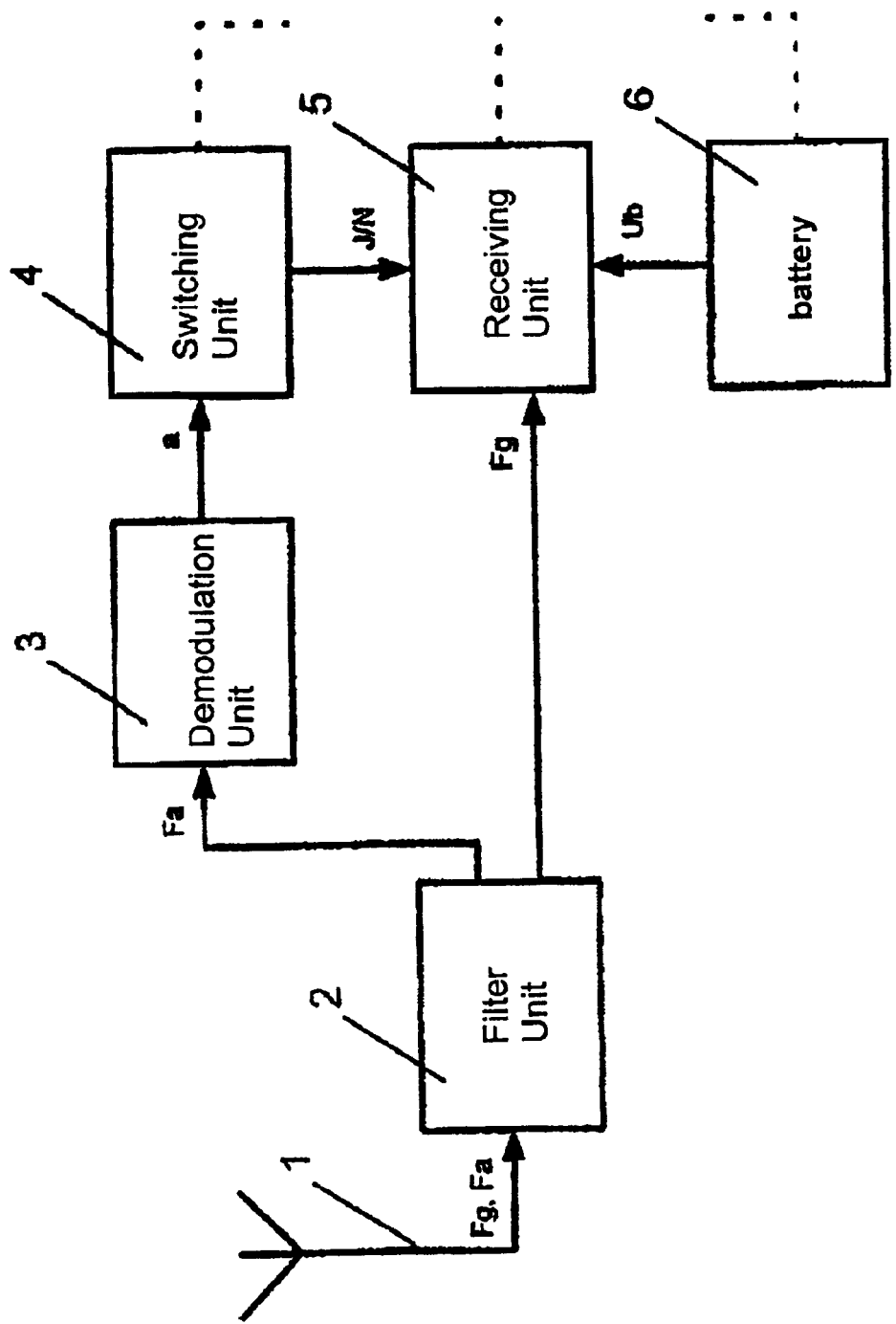
FIG. 1 shows a block diagram of a configuration for switching from an energy saving standby mode to an operating mode in a receiver.

DESCRIPTION OF THE PREFERRED EMBODIMENTS:

Referring now to the figures of the drawing in detail and first, particularly, to FIG. 1 thereof, there is shown a receiver having an input connected to an antenna element 1 for receiving a signal, carrying information, in the form of a modulated RF signal. The signal carrying the information covers two modulated frequency bands (Fg, Fa). One frequency band (Fg) is intended for the basic information (g), for example, an AF signal (speech) that is modulated onto the RF carrier frequency. The other frequency band (Fa) contains wake-up information (a) that is transmitted from the transmitter in order to switch the receiver from a standby mode to an operating mode in which the basic information (g) can be subsequently received and processed.

First of all, a filter unit 2, which is connected downstream from the antenna unit 1, separates the frequency band (Fa) for the wake-up information (a) from the incoming signal carrying the information. The filter unit 2 is in the form of a SAW filter. The wake-up information (a) has been modulated in the frequency band (Fa) using chirp pulses, and is evaluated in an appropriate manner by the filter element 2. The wake-up information (a) in the frequency band (Fa) may in this case be in the form of a pulse sequence (burst).

The pulse sequence contained in the separated frequency band (Fa) is supplied to a passive demodulation unit 3 for demodulating the wake-up information (a). The passive demodulation unit 3 is connected downstream from the filter unit 2. The passive demodulation unit 3 is in the form of a passive tuned circuit that is tuned to the pulse repetition frequency, in order to filter out the pulse sequence containing the wake-up information (a) from the frequency band (Fa).

The wake-up information (a) obtained in this way is passed to a switching unit 4. When wake-up information (a)

is present on the input, the switching unit 4 switches a receiving unit 5, and possibly, further components in the receiver (dashed lines) to the operating mode. The receiving unit 5 is now able to select the subsequent basic information (g) from the frequency band (Fg), as it is made available by the filter element 2.

A voltage supply unit 6 in the form of a battery is provided for the receiver. The voltage supply unit 6 supplies the receiving unit 5, and possibly, further components in the receiver (dashed lines) with the necessary supply voltage.

Since the switching unit 4 is used for switching between the operating mode and the standby mode, the receiving unit 5 and possibly, further active components are switched back to the standby mode when their wake-up information (a) is not present, or when specific information for selecting the standby mode is predetermined by the receiving unit 5 or by downstream logic circuits.

The configuration described above for switching from the energy saving standby mode to the operating mode operates as follows, when considered as an entity.

First of all, a signal carrying information is received in a number of modulated frequency bands (Fg, Fa). The signal relating to the frequency band (Fg) is then filtered for basic information (g) and the signal relating to the frequency band (Fa) is filtered for wake-up information (a). The frequency band (Fa) is then demodulated in order to obtain the wake-up information (a). The process of waking up from the standby mode to the operating mode takes place when the frequency band (Fa) contains wake-up information (a). The basic information (g) which is contained in the frequency band (Fg) can then be processed in some suitable way. Otherwise, the system remains in the standby mode for as long as the frequency band (Fa) does not contain any wake-up information (a).

Figure 2:
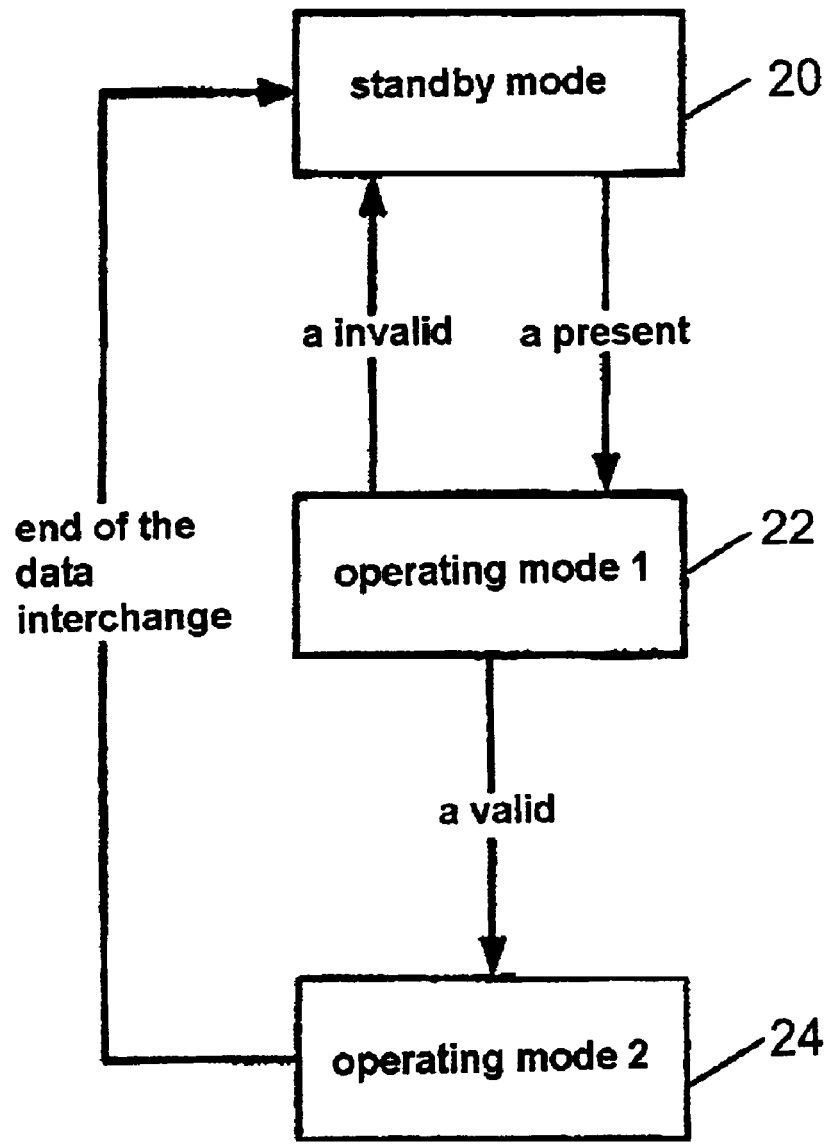
FIG. 2 shows a state diagram to illustrate a method for switching between the modes using the configuration shown in FIG. 1.

FIG. 2 shows the circuit in a first state, namely in the power-saving standby mode as indicated by the reference numeral 20. In this case, the frequency band (Fa) is monitored, preferably using passive components, for the presence of wake-up information (a), and minimal current is drawn. The presence of the wake-up information (a) is required to change into a second circuit state, namely the operating mode 1, which is indicated by the reference numeral 22. In the operating mode 1, the validity of the wake-up information is checked, during which only a small amount of current is being drawn. The small amount of current that is drawn likewise results from using mostly passive components for this checking process. If the wake-up information (a) is not valid, then the circuit switches back to the standby mode again. Otherwise, a change is made to a third circuit state, namely the operating mode 2, which is indicated using reference numeral 24. The operating mode 2 is the full-operation mode. In the operating mode 2, the regular current is drawn by the circuit, the signal in the frequency band (Fg) is received, and the basic information (g) contained in the signal in the frequency band (Fg) is processed after being demodulated. If required, an acknowledgement response may also be transmitted using circuit components provided for this purpose. Once the basic information (g) has been processed and the information interchange has been completed, the first circuit state, that is to say, the power-saving standby mode, is assumed once again.

The invention is not just restricted to the preferred exemplary embodiment described above. In fact, a number of variants are feasible, which also using fundamentally different types of embodiments of the invention. In particular, the invention is not just applicable to a receiver of the type described above, but it is intended to be applicable in general form to all electronic devices in which a function for switching from an energy saving standby mode to an operating mode will be provided. It is likewise feasible for the invention to be applied not only to battery-powered electronic devices but also to mains-powered electronic devices—for example, with voltage being supplied via a bus system—in order to this extent to reduce the current draw in the standby mode. Furthermore, it is also possible to switch from an energy saving standby mode to a (full) operating mode by passing through intermediate modes—for example, an information validity checking mode.

I claim:

1. An electronic device, comprising:

an antenna element for receiving a signal carrying information, the signal carrying the information including at least a first modulated frequency band for carrying basic information and a second modulated frequency band for carrying wake-up information;

a receiving unit for processing the basic information carried on the signal, said receiving unit having an operating mode and an energy saving standby mode;

a voltage supply unit for providing a supply voltage required for operation; and a switching unit for switching between the operating mode and the standby mode, said switching unit being actuated by the wake-up information.

2. The electronic device according to claim 1, comprising:

a filter unit connected downstream from said antenna unit, said filter unit separating the second frequency band carrying the wake-up information from the signal carrying the information; and a demodulation unit obtaining the second frequency band from said filter unit, said demodulation unit demodulating the wake-up information;

said demodulation unit being at least partially passive and actuating said switching unit.

3. The electronic device according to claim 2, wherein said demodulation unit is as passive as possible.

4. The electronic device according to claim 2, wherein:

said filter element is also designed for separating the first frequency band carrying the basic information from the signal carrying the information.

5. The electronic device according to claim 2, wherein: said filter unit is SAW filter.

6. The electronic device according to claim 1, wherein:

the wake-up information is processed by chirp compression to increase a magnitude of pulses in the second frequency band.

7. The electronic device according to claim 1, wherein:

the wake-up information is modulated to be in a form selected from the group consisting of a single pulse and a pulse sequence.

8. The electronic device according to claim 1, wherein:

in order to distinguish the wake-up information from disturbances, the wake-up information is a pulse sequence having a pulse repetition frequency;

said demodulation unit being designed in as a passive tuned circuit being tuned to the pulse repetition frequency in order to filter out the pulse sequence.

9. The electronic device according to claim 1, wherein:

the second frequency band carrying the wake-up information is a standardized, generally usable frequency band in a band range from 869.4 MHz to 869.65 MHz.

10. The electronic device according to claim 1, wherein:
the first frequency band carrying the basic information is a standardized frequency band for transmitting at a transmission power level of up to 5 mW in a band range from 869.7 MHz to 870.0 MHz.

11. The electronic device according to claim 1, wherein:
said voltage supply unit is a battery selected from the group consisting of a disposable battery and a rechargeable battery.

12. The electronic device according to claim 1, wherein said antenna element is matched to a nature of the signal carrying the information.

13. The electronic device according to claim 12, wherein said antenna element is in a form selected from the group consisting of a dipole, a coil, a capacitor plate, and a photoelement.

14. A method for switching from an energy saving standby mode to an operating mode, which comprises:

receiving a signal having a plurality of modulated frequency bands and carrying information;

filtering the signal to obtain a first frequency band for carrying basic information and a second frequency band for carrying wake-up information;

demodulating the second frequency band to obtain the wake-up information;

waking up from the standby mode to the operating mode when the second frequency band contains the wake-up information, and subsequently processing the basic information carried in the first frequency band; and remaining in the standby mode for as long as no wake-up information is being carried by the second frequency band.

15. The method according to claim 14, which comprises: switching from the standby mode to the operating mode.

* * * * *